United States Patent [19]
Pohl

[11] Patent Number: 4,976,133
[45] Date of Patent: Dec. 11, 1990

[54] INSTRUMENT FOR ADJUSTING AND CALIBRATING TORQUE WRENCHES

[75] Inventor: Peter Pohl, Hilden, Fed. Rep. of Germany

[73] Assignee: CDI consolidated devices inc, City of Industry, Calif.

[21] Appl. No.: 444,688

[22] Filed: Dec. 1, 1989

[30] Foreign Application Priority Data

Dec. 2, 1988 [DE] Fed. Rep. of Germany ....... 3840684

[51] Int. Cl.⁵ ............................................ G01L 25/00
[52] U.S. Cl. ............................... 73/1.00 C; 73/862.08
[58] Field of Search ............... 73/1 C, 862.08, 862.26; 364/571.01

[56] References Cited

U.S. PATENT DOCUMENTS 4,522,075  6/1985  Pohl ............................ 73/862.26 X

FOREIGN PATENT DOCUMENTS

0100023  2/1984  European Pat. Off. .
0173432  9/1985  Japan ................................. 73/862.08

Primary Examiner—Charles A. Ruehl
Attorney, Agent, or Firm—Peter K. Kontler

[57] ABSTRACT

The electric circuit of the torque indicator in a torque wrench is automatically adjusted by the electric circuit of a detachable adjusting and calibrating instrument which is separably connectable to the wrench so that its torsion bar is deformable by the torque applicator wrench. Each circuit includes a microprocessor with means for displaying the measured torque, and interfaces are provided to separably connect the microprocessors to each other preparatory to an adjusting or calibrating operation. Each circuit further comprises one or more bridge circuits with strain gages, amplifiers for signals at the outputs of the bridge circuits, and analog-digital converters for transmission of signals from amplifiers to the respective microprocessor.

18 Claims, 5 Drawing Sheets

INSTRUMENT FOR ADJUSTING AND CALIBRATING TORQUE WRENCHES

BACKGROUND OF THE INVENTION

The invention relates to improvements in torque applying and indicating apparatus, hereinafter called torque wrenches, and more particularly to instruments for adjusting and calibrating torque wrenches.

Torque wrenches are used for the application of torque to nuts, heads of bolts (particularly bolts with extensible shanks) and like parts, and for simultaneous indication of the magnitude of applied torque. European patent No. 100 023 discloses a torque wrench wherein an elastically deformable arm includes a torque applying portion (e.g., a socket which can receive a nut or the head of a bolt) and a handle which is spaced apart from the torque applying portion and can be engaged by hand to turn the arm about the axis of the nut or bolt in order to apply torque or to reduce the magnitude of applied torque. The torque wrench further comprises a torque indicator having electrical components which serve to ascertain and indicate the magnitude of applied torque. The torque indicator normally comprises one or more strain gages which are affixed to and extend longitudinally of an elastically deformable part of the arm and are connected in one or more Wheatstone bridges or analogous circuits (hereinafter called bridge circuits for short). The signal transmitting output of each bridge circuit is connected with an amplifier which transmits amplified signals to a memory. The latter is connected with a microprocessor by way of an analog-digital converter and includes, or is combined with, digital means for displaying signals denoting the magnitude of applied torque.

In order to calibrate and/or otherwise adjust or test the patented torque wrench, the torque applying portion of the arm is to be connected with a calibrating instrument which is provided with its own torque indicator. Thus, when the arm is used to apply torque to the calibrating instrument, information denoting the magnitude of applied torque is supplied by the indicator of the torque wrench as well as by the indicator of the calibrating instrument. If the information which is furnished by the indicator of the torque wrench departs from that which is furnished by the torque indicator of the calibrating instrument, the electric circuitry of the torque indicator forming part of the torque wrench is adjusted until the information which is furnished by the displaying means of the torque indicator forming part of the wrench matches that which is supplied by the torque indicator of the calibrating instrument. The adjustment involves the utilization of a potentiometer to adjust the aforementioned amplifier or amplifiers which receive signals from the output or outputs of the bridge circuit or circuits in the torque indicator of the wrench. Such adjustment of one or more amplifiers is a time-consuming operation and must be carried out by an experienced operator, especially if the wrench is to be calibrated in a manner to ensure that its indicator can furnish accurate information relating to a rather wide range of torques. Since the torque indicators of many wrenches comprise several bridge circuits, it is then necessary to adjust two or more amplifiers which contributes to complexity and duration of the adjusting and/or calibrating operation. Additional problems arise when the adjustment involves a change from one measuring system to another.

OBJECTS OF THE INVENTION

An object of the invention is to provide a calibrating instrument which can be utilized to automatically adjust and/or calibrate a torque wrench or an analogous torque applying and indicating apparatus.

Another object of the invention is to provide a novel and improved combination of torque wrench and calibrating instrument therefor.

A further object of the invention is to provide a novel and improved method of calibrating a torque wrench.

An additional object of the invention is to provide the calibrating instrument with novel and improved means for separably connecting it with the torque indicator of a torque wrench.

Still another object of the invention is to provide a calibrating instrument which can be operated by semi-skilled or even unskilled persons.

A further object of the invention is to provide a calibrating instrument which can automatically calibrate a torque wrench within a small fraction of the time that is required to calibrate a torque wrench in accordance with heretofore known proposals.

An additional object of the invention is to provide the calibrating instrument with novel and improved means for processing signals denoting torque that is applied thereto by a wrench which is to be tested and (if necessary) calibrated.

SUMMARY OF THE INVENTION

One feature of the present invention resides in the provision of an instrument for adjusting and calibrating a torque applying and indicating apparatus (e.g., an apparatus of the type known as or resembling or performing the function of a torque wrench) wherein a torque applying portion or applicator is operative to apply torque (e.g., to a nut or to the head of a bolt) and a torque indicator is operative to generate first signals (particularly electric signals) denoting the magnitude of torque which is applied by the applicator. The improved instrument comprises an input element which is connectable with the applicator and is designed to undergo deformation the extent of which is indicative of the magnitude of torque applied thereto by the applicator, means for monitoring the extent of deformation of the input element and for generating second signals (preferably electric signals) denoting the extent of deformation of the input element and hence the magnitude of torque which is applied to the input element by the applicator of the torque applying and indicating apparatus, means for comparing the second signals with the first signals, and means for adjusting the indicator when the first signals deviate from the respective second signals.

The monitoring means can comprise a bridge circuit including at least one strain gage which is connected with the input element. The output of the bridge circuit transmits second signals, and the comparing means can comprise a microprocessor and analog-digital converter means between the output of the bridge circuit and the microprocessor. The microprocessor is provided with or is connected to means for displaying the second signals in order to permit visual comparison of first and second signals.

The torque indicator of the torque applying and indicating apparatus preferably includes an adjustable electric circuit, and the adjusting means then preferably includes means for adjusting the circuit of the torque indicator in response to deviation of second signals from the respective first signals.

The input element can include a torsion bar or the equivalent of a torsion bar. Such torsion bar is designed to be twisted by the applicator of the torque applying and indicating apparatus, and the at least one strain gage of the monitoring means is connected with the torsion bar to initiate the generation of electric signals the characteristics (e.g., intensity) of which are indicative of the magnitude of torque that is applied to the torsion bar.

The comparing means can include a second electric circuit, and the adjusting means then preferably comprises at least one interface or an equivalent of an interface which is connected with one of the two circuits (i.e., with the electric circuit of the torque indicator or with the electric circuit of the comparing means) and is connectable with the other of these circuits.

If the adjustable electric circuit of the torque indicator comprises at least one adjustable analog-digital converter, the adjusting means can include means for transmitting analog correction signals to the at least one analog-digital converter in response to deviation of second signals from the respective first signals. Otherwise stated, the adjusting means can include means for transmitting to the adjustable electric circuit of the torque indicator analog signals in response to deviation of second signals from the respective first signals.

The adjusting means can include means for storing correction factors (i.e., data denoting various correction factors) and means for addressing the storing means and for transmitting to the adjustable electric circuit of the torque indicator selected correction factors in response to deviation of second signals from the respective first signals. The storing means can include a random access memory and/or an EEPROM and/or another suitable memory. Furthermore, the storing means can include a plurality of memories and means for separably coupling at least one of the memories to the electric circuit of the torque indicator.

The torque applying and indicating apparatus can be of the type wherein the applicator is elastically deformable as a result of the application of torque and wherein the electric circuit of the torque indicator comprises a plurality of bridge circuits having strain gages provided on the torque applicator and having outputs for signals denoting the extent of elastic deformation of the applicator. Such electric circuit further includes a microprocessor having means for displaying the first signals and adjustable means for transmitting signals from the outputs of the bridge circuits to the microprocessor. The adjusting means of the instrument which is used with such apparatus comprises means for individually adjusting the signal transmitting means between the outputs of the bridge circuits and the microprocessor in response to deviation of first signals from the respective second signals. The adjusting means can include means for adjusting the zero point(s) of the bridge circuit(s) in the electric circuit of the torque indicator.

Another feature of the invention resides in the combination of a torque applying and indicating apparatus with an instrument for adjusting and/or calibrating the apparatus. The apparatus comprises a torque wrench including an elastically deformable applicator in the form of an arm having a torque applying portion and a handgrip portion spaced apart from the torque applying portion, and an adjustable torque indicator which is operative to generate first electric signals denoting the magnitude of torque which is applied by the torque applying portion of the arm. The torque indicator includes at least one bridge circuit having a strain gage provided on the arm to exhibit a resistance which is a function of the extent of elastic deformation of the arm as a result of the application of torque by the torque applying portion of the arm. The bridge circuit has an output for signals denoting the resistance of the strain gage, and the indicator further comprises means for amplifying signals which are received from the bridge circuit, means for storing the amplified signals, a microprocessor having or being combined with means for displaying the first signals, and means for connecting the signal storing means with the microprocessor. The instrument comprises an elastically deformable input element which is connectable with the torque applying portion of the arm to undergo deformation the extent of which is indicative of the magnitude of torque that is applied thereto by the torque applying portion of the arm, means for monitoring the extent of deformation of the input element and for generating second electric signals denoting the extent of deformation of the input element and hence the magnitude of torque which is applied by the torque applying portion of the arm, means for comparing the second signals with the respective first signals, and means for automatically adjusting the indicator when the second signals deviate from the respective first signals.

The monitoring means can comprise a second bridge circuit having at least one second strain gage which is connected with the input element and is designed to vary its resistance as a function of changes of elastic deformation of the input element. The second bridge circuit has an output for second signals, and the comparing means comprises a second microprocessor and means for connecting the second microprocessor with the output of the second bridge circuit. The connecting means can comprise analog-digital convertor means.

The adjusting means can comprise a first interface which is connected with the microprocessor of the torque indicator and a second interface which is connected with the second microprocessor and is separably connectable with the first interface.

The adjusting means can include at least one memory for data denoting correction factors and means (such as the microprocessor of the torque indicator) for addressing the memory in order to apply to the adjustable indicator selected correction factors in response to deviation of second signals from the respective first signals.

The novel features which are considered as characteristic of the invention are set forth in particular in the appended claims. The improved instrument itself, however, both as to its construction and its mode of cooperating with a torque applying and indicating apparatus, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
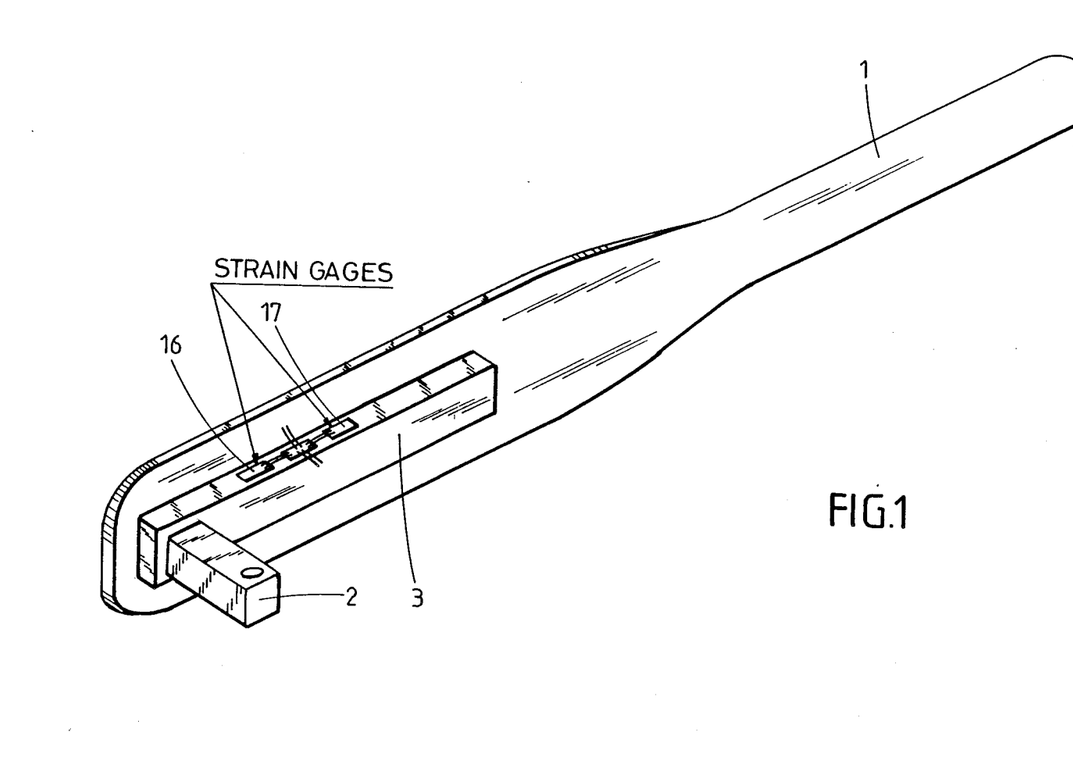
FIG. 1 is a schematic perspective view of a torque wrench.

FIG. 1 shows a torque wrench which includes an elongated elastically deformable torque applicator in the form of an arm with a torque applying portion 2 (e.g., a relatively short stub having a square or other polygonal cross-sectional outline) at one end and a handle 1 at the other end. The torque applying portion 2 can be directly coupled with an object, such as the head of a bolt having an extensible shank, or the portion 2 can be connected with an adapter having a socket which serves to directly receive a nut, the head of a bolt or any other object to which torque is to be applied with a high degree of accuracy. The torque wrench of FIG. 1 can also serve to merely ascertain the magnitude of torque which was previously applied to a bolt, a nut or an analogous object by another implement or apparatus. For example, the wrench of FIG. 1 can be used to apply torque to the heads of bolts having extensible shafts which are to be driven into workpieces. The objects to which torque is to be applied and the workpieces which are to be engaged by or into which the objects are to be driven are not shown in FIG. 1 for the sake of clarity.

A torsion bar 3 is reliably secured (preferably welded) to and extends longitudinally of the arm in the region of the torque applying portion 2 so that it undergoes elastic deformation which is proportional to the magnitude of applied torque. The torque applying portion 2 is or can be welded or otherwise reliably secured to one end of the torsion bar 3. The arm of the illustrated wrench can constitute an elongated flat piece of iron. The entire arm can constitute a torsion bar, i.e., the handle 1 can constitute that end portion of the torsion bar which is remote from the torque applying portion 2.

The torque indicator of the torque wrench of FIG. 1 comprises an electric circuit 43 (FIG. 3) with two bridge circuits 18, 19 respectively having strain gages 16, 17 which are applied to the torsion bar 3. The strain gage 16 constitutes one of four resistances in the bridge circuit 18, and the strain gage 17 constitutes one of four resistances in the bridge circuit 19. These strain gages are applied to the torsion bar 3 in such a way that their resistance varies proportionally with the extent of elastic deformation (stretching or shortening) of the corresponding portion of the torsion bar, i.e., proportionally with the magnitude of torque which is being applied by the portion 2 of the wrench shown in FIG. 1. That portion of the torsion bar 3 which carries the strain gages 16, 17 will be stretched or shortened in dependency upon the direction of turning of the arm about the axis of the torque applying portion 2. As shown in FIG. 1, the strain gages 16, 17 are spaced apart from each other in the longitudinal direction of the torsion bar 3.

Figure 2:
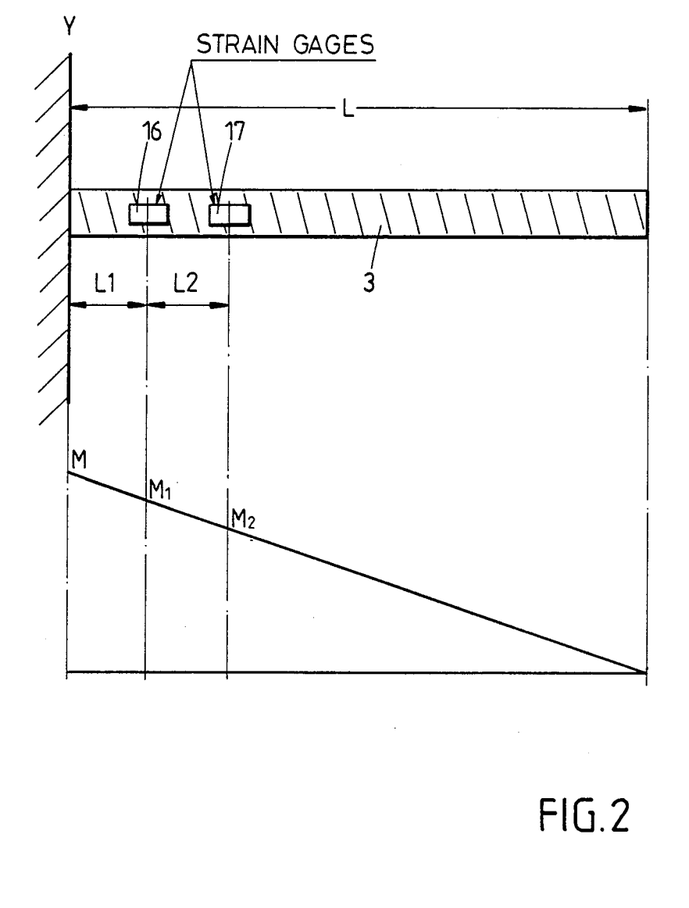
FIG. 2 is a diagram showing the magnitude of torque which is measured by two strain gages of the torque indicator in the wrench of FIG. 1.

FIG. 2 shows that the center of the strain gage 16 is located at a distance L1 from the axis Y of the torque applying portion 2 and at a distance L2 from the center of the strain gage 17, i.e., the distance from the center of the strain gage 17 to the axis Y of the torque applying portion 2 equals L1+L2. The axis Y of the torque applying portion 2 coincides with the axis of rotation of the arm of FIG. 1 in the course of a torque applying operation. It is preferred to select the positions of the strain gages 16, 17 on the torsion bar 3 in such a way that L1 equals L2.

As mentioned above, changes of resistance of the strain gages 16, 17 in the respective bridge circuits 18, 19 are proportional to the extent of stretching or shortening of the adjacent stratum of the torsion bar 3 and hence to the magnitude of torque which the portion 2 applies to a nut, to the head of a bolt or to a like object. The magnitude of applied torque determines the extent of bending of the tension bar 3. In addition to being dependent upon the magnitude of applied torque, the resistance of strain gages 16, 17 is also a function of the modulus of elasticity and of the moment of inertia of the torsion bar. When the handle 1 is used to turn the arm of FIG. 1 about the axis of the torque applying portion 2, the lever arm, the modulus of elasticity and the moment of inertia remain unchanged. Therefore, the extent of bending of the torsion bar 3 during application of torque to a bolt or nut is proportional to the magnitude of applied torque. If the electric circuit 43 of the torsion indicator in the torque wrench employs a single strain gage (e.g., the strain gage 16), the torque which is applied by the wrench equals $M1 \times L/(L-L1)$ wherein M1 is the torque measured by the strain gage 16 and L is the lever arm (distance from the axis Y of the torque applying portion 2 of the locus of application of force to the handle 1), i.e., the measured torque is a function of the locus of application of force to the handle 1. Thus, and in order not to affect the accuracy of measurement, the application of force must take place to one and the same portion of the handle 1, i.e., at a predetermined distance from the axis of the torque applying portion 2.

The provision of several strain gages in the circuit 43 renders it possible to accurately determine the magnitude of applied torque irrespective of the exact locus of application of force to the handle 1. All that is necessary is to properly relate the signals which are transmitted by the output of the bridge circuit 18 including the strain gage 16 with the signals at the output of the bridge circuit 19 including the strain gage 17.

FIG. 2 shows variations of torque applied by a torque bar which is anchored at one end (in the region of the torque transmitting portion) in cantilever fashion. The torques which are ascertained by the strain gages 16, 17 are respectively shown at M1 and M2. As mentioned above, the distance of the center of the strain gage 16 from the axis Y of the torque applying portion 2 equals L1, and the distance of the center of the strain gage 17 from the center of the strain gage 16 equals L2, i.e., the distance of the center of strain gage 17 from the axis Y of the torque transmitting portion 2 equals L1+L2. Thus, torque M at the locus of application of the portion 2 to a nut or bolt equals $M1 + (L1/L2) \times (M1-M2)$. If L1 equals L2, M equals 2M1-M2. Thus, it is then possible to ascertain torque at the locus of application (by 2) independently of the locus of application of force to the handle of the torque wrench.

Figure 3:
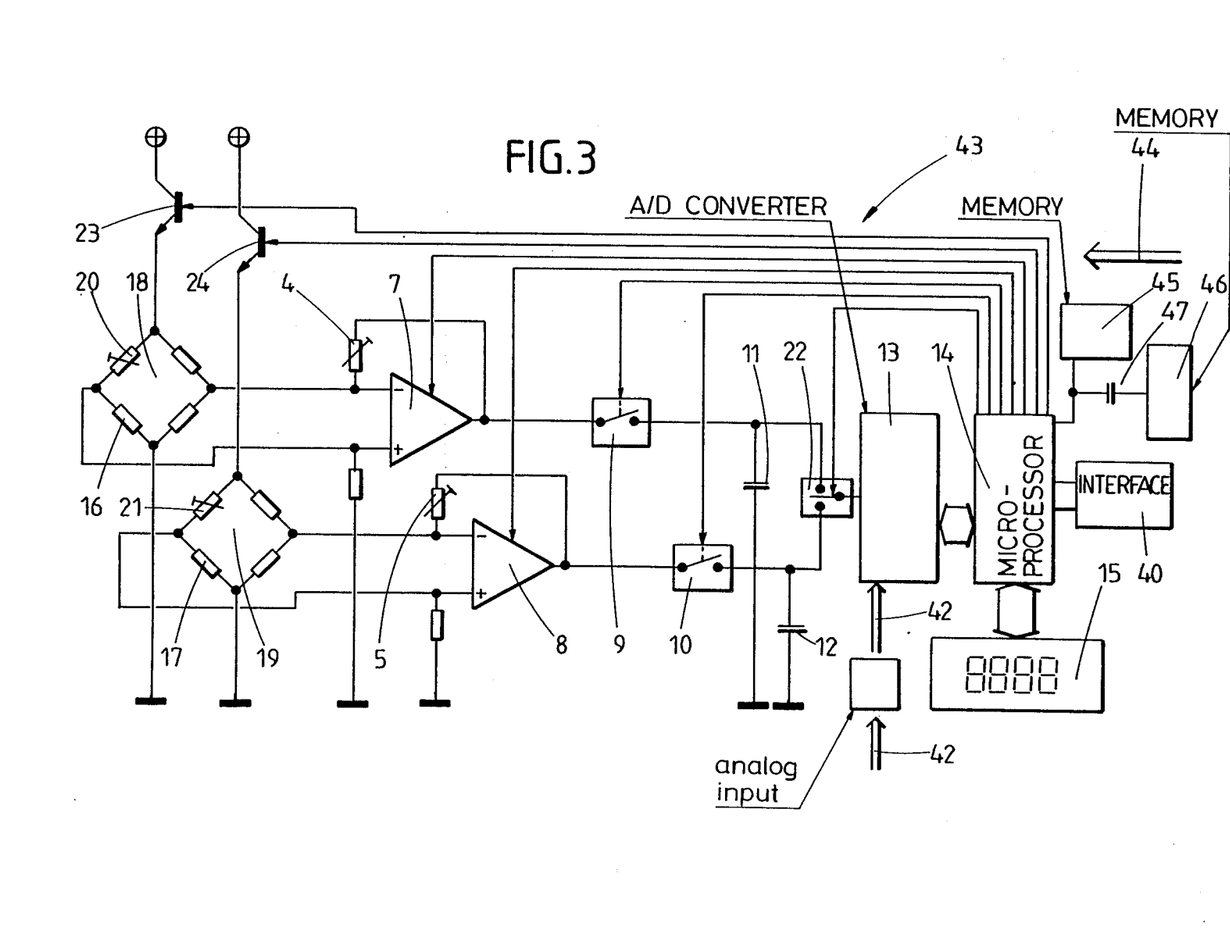
FIG. 3 shows the electric circuit of the torque indicator in the wrench of FIG. 1.

The details of the electric circuit 43 of the torque indicator forming part of the torque wrench are shown in FIG. 3. The output of the bridge circuit 18 is connected with a first amplifier 7, and the output of the bridge circuit 19 is connected to a second amplifier 8. Accurate adjustment of zero points of the bridge circuits 18, 19 is carried out with correction factors. Coarse adjustment of the zero point of the bridge circuit 18 can be effected by one (20) of its four resistances including the strain gage 16, and coarse adjustment of the zero point of bridge circuit 19 can be effected with one (21) of its four resistances (including the strain gage 17). The resistances 20 and 21 are variable resistances. Instead of selecting the zero points by way of variable resistances 20 and 21, it is also possible to employ potentiometers, not shown.

Correction factors are resorted to for accurate adjustment of the amplifiers 7 and 8. In addition, the circuit 43 comprises a potentiometer 4 to adjust the amplifier 7, and a potentiometer 5 to adjust the amplifier 8. These potentiomenters are utilized for coarse preliminary adjustment of the respective amplifiers 7 and 8, particularly if the moment of resistance (and hence also the moment of inertia) of the torsion bar 3 departs from the desired value due to manufacturing tolerences.

The proportional stress-strain limit or factor K of strain gages 16 and 17 can also deviate from an optimum value due to tolerances. This limit or factor K is the ratio of relative longitudinal stretching to change of resistance of a strain gage. Potentiometers can be employed to compensate for inaccurate application of strain gages 16, 17 to the torsion bar 3, i.e., for improper selection of the distance L1 and/or L2.

The output of the amplifier 7 is connected with a switch 9 which can be closed to permit transmission of signals to a memory 11. Analogously, the output of the amplifier 8 can be connected with a memory 12 by way of a switch 10. Each of the memories 11, 12 constitutes or includes a capacitor. A third switch 22 is provided to alternatingly connect the memories 11, 12 with the corresponding input of an analog-digital converter 13 which, in turn, is connected with the input of a microprocessor 14. The latter includes or is connected with a digital display 15. The microprocessor 14 controls the operation of the switches 9, 10 and 22 as well as the amplifiers 7, 8 and the bridge circuits 18, 19. Still further, the microprocessor 14 controls two transistors 23 and 24 which can connect the bridge circuits 18, 19 with an energy source for relatively short intervals of time at a selected frequency, preferably for intervals of 15 to 200 microseconds. When the torque wrench is in use, measurements of torque are carried out for such short intervals at selected frequencies in order to save electrical energy. For example, the torque indicator including the circuit 43 of FIG. 3 can complete approximately 20 torque measurements per second which entails the consumption of relatively small amounts of electrical energy. The microprocessor 14 can regulate the frequency of torque measurements, for example, in such a way that the frequency of measurements is increased when the applied torque undergoes a pronounced change. The frequency of measurements is or can be greatly reduced when the magnitude of applied torque remains unchanged; this results in additional savings in energy and avoids unnecessary frequent measurements when the applied torque remains unchanged.

The microprocessor 14 causes the transistors 23, 24 to complete the connections between the respective bridge circuits 18, 19 and the energy source for periods of time amounting to minute fractions of the duration of an actual measuring cycle; the outputs of the bridge circuits 18, 19 then transmit signals to the corresponding memories 11 and 12 by way of the respective amplifiers 7, 8 and switches 9, 10. This entails additional savings in electrical energy, not only between successive measuring intervals but also in the course of each measuring operation. The information which is stored in the memories 11, 12 is indicative of amplified signals from the respective bridge circuits and is transmitted from these memories for evaluation in the microprocessor 14 via analog-digital converter 13 in a selected sequence. The converter 13 is relatively slow; however, and since it transmits data from the memories 11, 12 rather than directly from the circuits 18, 19 or amplifiers 7, 8, the bridge circuits need not be connected with the energy source during the entire analog-digital conversion period. A relatively slow analog-digital converter is preferred at this time because its energy requirements are small. It is further possible to disconnect the analog-digital converter 13 from the microprocessor 14 when the torque wrench is not in actual use.

The memories (capacitors) 11 and 12 are charged during those intervals of time when the respective switches 9, 10 are closed by the microprocessor 14 while the transistors 23, 24 connect the corresponding bridge circuits 18, 19 with the energy source. The microprocessor 14 opens the switches 9, 10 before the transistors 23, 24 disconnect the bridge circuits 18, 19 from the energy source. The switch 22 is open during charging of the memories 11 and 12. This switch is closed by the microprocessor 14, in a sense to connect the analog-digital converter 13 with the memory 11 or 12, only while the respective memory is addressed to transmit signals to the microprocessor 14. Such mode of operation is also intended to reduce the energy requirements of the circuit 43. Additional savings of energy can be achieved by disconnecting the amplifiers 7, 8 from the energy source during the intervals between measuring cycles.

The bridge circuits 18, 19 are preferably designed to transmit, when the measured torque equals zero, signals having an intensity (voltage) which is half the maximum voltage to be processed by the analog-digital converter 13. During torque measurement while the arm of the torque wrench is turned in one direction, voltage varies within the range between one-half and maximum value, and such voltage varies between zero and one-half the maximum value when the arm is turned in the opposite direction. Thus, it is possible to measure positive and negative torques in a very simple and reliable way, i.e., the information which is displayed at 15 can indicate whether the wrench is used for the application of positive or negative torque. Maximum voltage to be processed by the analog-digital converter can equal or approximate 2.5 volts. When the measured torque is zero or close to zero, the bridge circuits 18, 19 supply to the analog-digital converter 13 a voltage in the range of 1.25 volt.

When the measured torque equals zero, the circuit 43 should be capable of comparing the actual voltage of signals at the outputs of the bridge circuits 18, 19 with a desired or reference voltage so that the microprocessor 14 is then in a position to apply appropriate correction values to (first) signals which are displayed at 15 irrespective of whether the wrench is in the process of applying positive or negative torque. This renders it possible to automatically compensate for thermally induced changes of the length of strain gages 16, 17 in a simple and efficient manner. The microprocessor 14 can be programmed to ascertain the average value of a series of successive signals or to memorize the maximum-intensity signal of a series of signals in order to display (when addressed) the average signal or the maximum-intensity signal.

The torque indicator including the circuit 43 of FIG. 3 can be designed to furnish an optical and/or acoustical indication whenever the applied torque reaches or closely approximates (within the prescribed plus and minus tolerences) a preselected value. This facilitates the task of the operator because she or he is informed (optically and/or acoustically) that the application of torque should be interrupted or terminated. The arrangement may be such that a green signal lamp (not shown) lights up when the magnitude of applied torque reaches the lower limit of the acceptable value, and a red signal lamp (not shown) lights up when the magnitude of applied torque reaches the maximum acceptable value. Furthermore, the circuit 43 can cause an acoustical alarm device to generate a signal in response to lighting of the green lamp and during the interval while the magnitude of applied torque continues to rise toward the maximum acceptable value. A keyboard or the like can be provided to enable the operator to furnish the circuit 43 with information (e.g., in percent) pertaining to the desired range of acceptable torques.

When the red signal lamp lights up, i.e., when the magnitude of applied torque reaches the maximum acceptable value, the operator can simply reverse the direction of turning of the arm of the torque wrench in order to ensure that the microprocessor 14 will eliminate the signal pertaining to such excessive torque from the series of signals which are used to calculate the aforediscussed average value or to eliminate the signal of maximum intensity from consideration as a correction value.

When the operator notes that the magnitude of torque which has been applied to a nut, a bolt or another object exceeds the maximum permissible value, the arm of the wrench is turned in the opposite direction to reduce the applied torque. This automatically results in the elimination of the signal or signals denoting an excessive torque from further consideration as a correction factor, i.e., such signal or signals are not used for calculation of average values and/or for corrections which are needed to account for thermally induced changes of the length of the strain gages 16, 17 and/or for other purposes. The microprocessor 14 can be designed to average only those signals which are indicative of torques within the acceptable range of torques; the microprocessor then disregards (for the purposes of averaging or selecting signals of maximum intensity) all other signals including those which are generated as a result of changing the direction of turning of the arm of the torque wrench.

Still further, the microprocessor 14 can be used to change the voltage which is applied to the bridge circuits 18, 19 by way of the respective transistors 23, 24 and/or in any other suitable way, i.e., to change the torque measuring range. Such changes of the measuring range can also be achieved in other ways, e.g., by altering the amplification of signals which are transmitted by the outputs of the bridge circuits 18 and 19.

The microprocessor 14 can also serve as a means for changing the units of measurement of applied torque. For example, the microprocessor 14 can cause the display 15 to furnish information in kilopond meters or in newton meters. Still further, the microprocessor 14 can be designed to initiate the indication of measured torque in the English or any other system of units.

The adjusting and calibrating instrument for the torque wrench of FIGS. 1 and 3 comprises an input element 26 (FIG. 4) which can constitute a torsion bar and carries a strain gage 32. One end portion of the torsion bar 26 is fixedly secured (e.g., welded) to one wall 27 of a housing or casing 25, and the other end portion 28 of the torsion bar 26 is turnable in an opening 29 in the opposite wall 30 of the housing. The end portion 28 has a socket 31 which is bounded by a polygonal surface complementary to the external surface of the torque transmitting portion 2 of the torque wrench of FIG. 1. The torsion bar 26 undergoes elastic deformation when the torque applying portion 2 is properly received in the socket 31 and the arm of the torque wrench is turned about the comon axis Y of the portion 2 and socket 31.

The strain gage 32 constitutes one resistance of a bridge circuit 34 (FIG. 5) forming part of the electric circuit of the improved adjusting and calibrating instrument. The circuit 34 monitors the magnitude of applied torque and its output transmits corresponding electric signals to an amplifier 35. The signals which are transmitted by the output of the bridge circuit 34 are indicative of torque which is applied by the portion 2 of the wrench of the torsion bar 26. That layer of this torsion bar which carries the strain gage 32 causes the latter to change its resistance proportionally with the magnitude of applied torque and resulting elastic deformation (twisting) of the torsion bar 26 in the housing 25. Deformation and the resulting change of resistance of the strain gage 32 is further a function of the modulus of elasticity and the moment of inertia. The bridge circuit 34 in the electric circuit of the improved instrument includes a total of four resistances including a variable resistance 33 which can be used as a means for adjusting the zero point of the bridge circuit 34.

Figure 5:
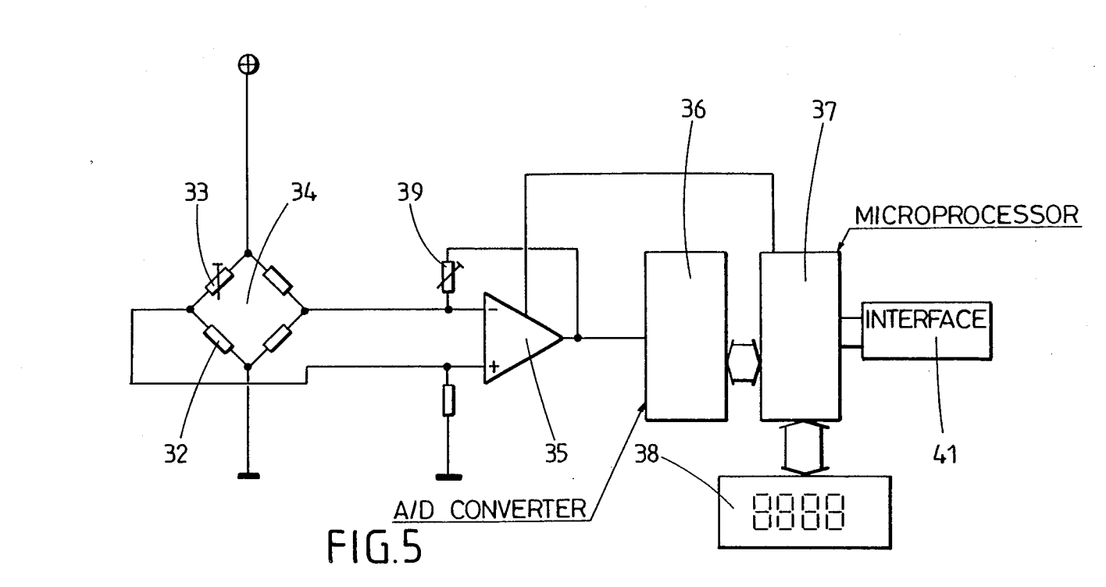
FIG. 5 is a diagram of the electric circuit of the instrument of FIG. 4.

The output of the amplifier 35 transmits amplified signals from the output of the bridge circuit 34 to an analog-digital converter 36 which, in turn, transmits (second) signals to a microprocessor 37 embodying or connected with a digital display 38 for second signals, i.e., for signals denoting the magnitude of torque which is applied to the torsion bar 26 simultaneously with the application of identical torque to the torsion bar 3 of the torque wrench of FIG. 1. The microprocessor 37 controls the amplifier 35, and the latter is adjustable by a potentiometer 39.

The microprocessor 37 not only compares the (first) signals from the microprocessor 14 with (second) signals from the amplifier 35 but also constitutes, includes or cooperates with means for adjusting the electric circuit 43 of the torque indicator when the intensity and/or any other characteristic of first signals (generated by the torque indicator of the torque wrench) deviates from the corresponding characteristic of the respective second signals.

The means for separably coupling the microprocessor 37 of the improved instrument with the microprocessor 14 of the electric circuit 43 includes a first interface 40 which is or can be permanently connected with the microprocessor 14 and a second interface 41 which is or can be permanently connected with the microprocessor 37 and can be separably coupled to the interface 40 so that the interfaces transmit correction signals to the microprocessor 14 and/or cause the microprocessor 14 to initiate the generation or application of correction signals or correction factors to various elements of the circuit 43. The interfaces 40, 41 enable the microprocessors 14, 37 to establish a dialogue leading, when necessary, to appropriate adjustment of the circuit 43 in order to ensure that the torque wrench is properly adjusted or calibrated, i.e., that the information which is displayed at 15 matches the information which is displayed at 38.

The arrangement may be such that, when necessary, the microprocessor 37 initiates the transmission of analog correction factors to the analog-digital converter 13 of the circuit 43. This is shown schematically by the arrow 42 in the lower right-hand portion of FIG. 3. Alternatively, the electric circuit of the improved instrument can serve to transmit (when necessary) analog or digital correction factors (arrow 44 in FIG. 3) to the electric circuit 43 of the torque indicator in the torque wrench, preferably to the microprocessor 14. The microprocessor 14 can be permanently or separably connected with a storing means including a memory 45 (such as a random access memory or an EEPROM) which stores information in the form of a table or chart and is addressed by the microprocessor 14 in response to a signal from the microprocessor 37 (when the first signals deviate from the second signals) to effect an appropriate adjustment of one or more elements in the circuit 43. The memory 45 can store correction factors for different magnitudes of torque. This memory enables the circuit of the improved instrument to calibrate, adjust and/or otherwise influence the torque indicator of the wrench as long as and/or to an extent necessary to ensure that the information which is supplied by the torque indicator of the wrench matches the information which is supplied by display 38. The just discussed calibration, adjustment and/or other changes of the torque indicator (circuit 43) can be carried out by a semiskilled or even unskilled operator because all adjustments are carried out automatically in response to proper coupling of the interface 41 with the interface 40. The instrument initiates an adjustment of the torque indicator in automatic response to deviation of first signals (displayed at 15) from second signals which are displayed at 38. If the measuring units which are displayed at 15 are newton meters, the information at 38 is also in the form of newton meters. Alternatively, the displays 15, 38 can furnish information in kilopond meters. As mentioned above, the microprocessors 14, 37 can be designed to enable the displays 15, 38 to furnish information in English measuring units.

The improved instrument can be further provided with means for supplying information denoting the number and nature of applications of the torque wrench to a bolt, a nut or another object which is to be acted upon by torque of selected magnitude. Such information can be displayed when the wrench is put to use so that the operator is informed of the best mode of using the wrench for the application of torque to a particular object or to a series of particular objects.

When the improved instrument is put to use for calibration of the torque wrench, the microprocessor 37 of the instrument does not receive signals which are displayed at 15 but rather signals which are actually transmitted by the bridge circuits 18, 19 of the torque indicator. The circuit of the instrument then transmits signals constituting correction factors which are used to adjust the bridge circuit 18 and/or 19 (when necessary). Thus, and as already mentioned above the potentiometers 4 and 5 merely serve to effect coarse calibration via corresponding amplifiers 7 and 8 whereas the correction factors supplied by the instrument, or in response to signals from the instrument, serve to actually carry out a precise calibrating operation.

The start of a calibrating operation can be preceded by an adjustment of zero points of the bridge circuits 18, 19 in response to signals denoting correction factors which are supplied by the electric circuit of the instrument. Thus, the optional variable resistances 20, 21 merely serve for coarse adjustment of the zero point whereas the instrument initiates accurate or final adjustment of the zero point of each bridge circuit in the circuit 43 of FIG. 3. This renders it possible to dispense with the time-consuming conventional adjustment of bridge circuits with a potentiometer.

The aforementioned storing means for correction factors can include two or more memories. FIG. 3 shows a second memory 46 which is separably coupled to the connection between the memory 45 and the microprocessor 14, as at 47. The memory 46 can contain a table or chart of correction factors other than those in the memory 45, and the memory 46 is addressed by the microprocessor 14, when necessary, to apply selected correction factors to one or more elements of the circuit 43 in response to signals from the microprocessor 37 via interfaces 41 and 40 or in automatic response to connection of the memory 46 to the microprocessor 14 via coupling 47.

As a rule, the energy source for the elements of the circuit 43 includes one or more batteries. When the energy source is partly or fully exhausted, and the spent source is replaced with a fresh energy source, the correction factors which have been transmitted to the elements of the circuit 43 are lost. The purpose of the memory 46 is to store such correction factors and to ensure that the correction factors are reintroduced into the circuit 43 as soon as the spent energy source is replaced with a fresh source. This renders it possible to avoid the need for a fresh calibration upon replacement of a spent energy source.

Figure 4:
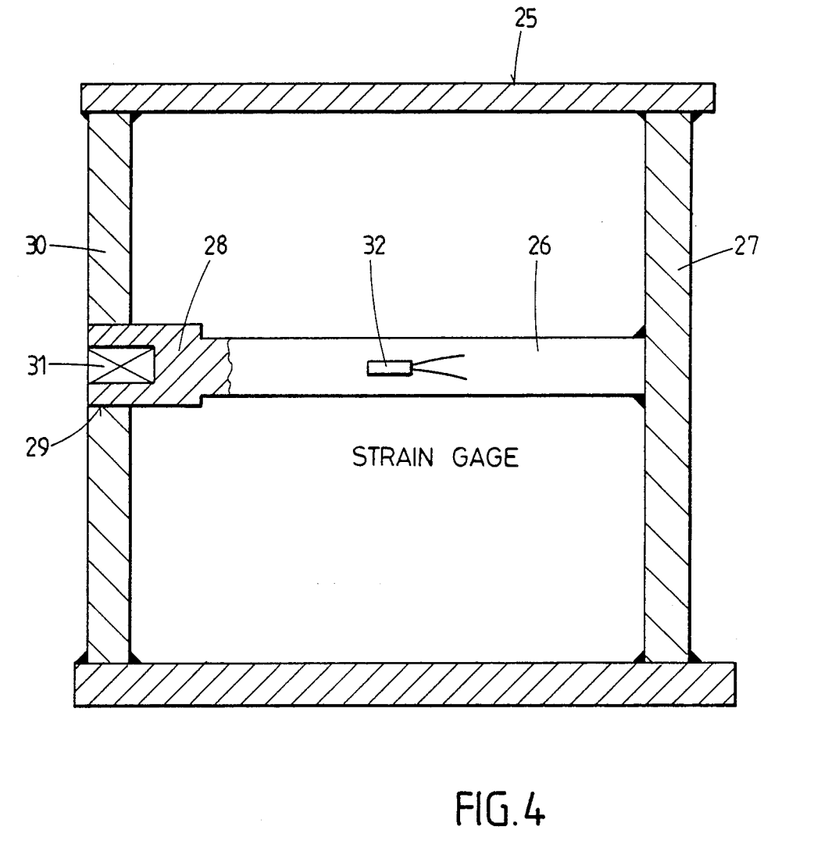
FIG. 4 is a schematic sectional view of the improved adjusting and calibrating instrument.

An important advantage of the improved adjusting and calibrating instrument, and of a combination of such instrument with the torque wrench, is its simplicity and reliability. Thus, once the instrument has been properly adjusted in the plant and is to be used by an operator, the operator need not have any knowledge of the construction and/or mode of operation of the instrument and/or of the torque indicator of the torque wrench. In order to calibrate the wrench, the operator merely inserts the torque applying portion 2 into the socket 31 of the torsion bar 26. The operator need not even observe the information which is displayed at 15 and/or 38 because the torque indicator of the wrench is calibrated in automatic response to application of torque to the torsion bar 26, i.e., in automatic response to application of force to the handle 1 of the arm forming part of the torque wrench.

Another important advantage of the improved instrument and of the combination of this instrument with the torque wrench is that the adjusting and/or calibrating operation can be carried out rapidly, with a high degree of accuracy, and with minimal consumption of electrical energy.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. An instrument for adjusting and calibrating a torque applying and indicating apparatus wherein a torque applicator is operative to apply torque and a torque indicator is operative to generate first signals denoting the magnitude of torque which is applied by the applicator, comprising an input element connectable with the applicator and arranged to undergo deformation the extent of which is indicative of the magnitude of torque applied thereto by the applicator; means for monitoring the extent of deformation of said input element and for generating second signals denoting the extent of deformation of said input element and the magnitude of torque which is applied to said input element by the applicator; means for comparing said second signals with the first signals; and means for adjusting said indicator when the first signals deviate from said second signals.

2. The instrument of claim 1, wherein said monitoring means comprises a bridge circuit including at least one strain gage connected with said input element, said circuit having an output for said second signals and said comparing means including a microprocessor and analog-digital converter means between said output and said microprocessor, said microprocessor having means for displaying said second signals.

3. The instrument of claim 1 for adjusting and calibrating a torque applying and indicating apparatus wherein the indicator includes an adjustable electric circuit, said adjusting means including means for adjusting said circuit in response to deviation of said second signals from the first signals.

4. The instrument of claim 3, wherein said input element includes a torsion bar which is arranged to be twisted by the applicator, said monitoring means including at least one strain gage connected with said torsion bar and arranged to initiate the generation of electric signals the characteristics of which are indicative of the torque applied to said torsion bar.

5. The instrument of claim 3, wherein said comparing means comprises a second electric circuit and said adjusting means includes at least one interface connected with one of said circuits and connectable with the other of said circuits.

6. The instrument of claim 3 for adjusting and calibrating a torque applying and indicating apparatus wherein the adjustable electric circuit of the indicator includes at least one adjustable analog-digital converter, said adjusting means including means for transmitting analog correction signals to the at least one analog-digital converter in response to deviation of said second signals from the first signals.

7. The instrument of claim 3, wherein said adjusting means includes means for transmitting to the electric circuit analog signals in response to deviation of said second signals from the first signals.

8. The instrument of claim 3, wherein said adjusting means includes means for storing correction factors and means for addressing said storing means and for transmitting to the electric circuit selected correction factors in response to deviation of said second signals from the first signals.

9. The instrument of claim 8, wherein said storing means includes a random access memory.

10. The instrument of claim 8, wherein said storing means includes an EEPROM.

11. The instrument of claim 3, wherein said storing means includes a plurality of memories.

12. The instrument of claim 11, further comprising means for separably coupling at least one of said memories to the electric circuit of said indicator.

13. The instrument of claim 3 for adjusting and calibrating a torque applying and indicating apparatus wherein the applicator is elastically deformable as a result of the application of torque and the indicator includes a plurality of bridge circuits including strain gages provided on the applicator and having outputs for signals denoting the extent of elastic deformation of the applicator, a microprocessor having means for displaying the first signals, and adjustable means for transmitting signals from the outputs of the bridge circuits to the microprocessor, said adjusting means including means for individually adjusting the signal transmitting means in response to deviation of said second signals from the first signals.

14. The instrument of claim 3 for adjusting and calibrating a torque applying and indicating apparatus wherein the torque indicator includes at least one bridge circuit, said adjusting means including means for adjusting the zero point of the bridge circuit.

15. The combination of a torque applying and indicating apparatus with an instrument for adjusting and calibrating said apparatus, said apparatus comprising a torque wrench including an elastically deformable arm having a torque applying portion and a handgrip portion spaced apart from said torque applying portion, and an adjustable torque indicator operative to generate first electric signals which denote the magnitude of torque applied by said torque applying portion, said indicator including at least one bridge circuit having a strain gage provided on said arm to exhibit a resistance which is a function of the extent of elastic deformation of the arm as a result of the application of torque by said torque applying portion, said circuit having an output for signals denoting the resistance of said strain gage and said indicator further comprising means for amplifying signals from said circuit, means for storing the amplified signals, a microprocessor having means for displaying said first signals, and means for connecting said storing means with said microprocessor, said instrument comprising an elastically deformable input element connectable with said torque applying portion to undergo deformation the extent of which is indicative of the magnitude of torque applied thereto by said torque applying portion, means for monitoring the extent of deformation of said input element and for generating second electric signals denoting the extent of deformation of said input element and the magnitude of torque which is applied by said torque applying portion, means for comparing said second signals with said first signals, and means for automatically adjusting said indicator when said second signals deviate from said first signals.

16. The structure of claim 15, wherein said monitoring means comprises a second bridge circuit including at least one second strain gage connected with said input element and arranged to vary its resistance as a function of changes of elastic deformation of said input element, said second bridge circuit having an output for said second signals and said comparing means comprising a second microprocessor and means for connecting said second microprocessor with the output of said second bridge circuit, said connecting means comprising analog-digital converter means.

17. The structure of claim 15, wherein said adjusting means comprises a first interface connected with the microprocessor of said torque indicator and a second interface connected with said second microprocessor and separably connectable with said first interface.

18. The structure of claim 15, wherein said adjusting means includes at least one memory for correction factors and means for addressing said memory to apply selected correction factors to said adjustable indicator in response to deviation of said second signals from said first signals.

* * * * *